US012725092B2

(12) United States Patent
Nakayama et al.

(10) Patent No.: US 12,725,092 B2
(45) Date of Patent: Sep. 1, 2026

(54) SYSTEM AND METHOD FOR DECENTRALIZED FEDERATED LEARNING

(71) Applicant: TieSet, Inc., Middletown, DE (US)

(72) Inventors: Kiyoshi Nakayama, Santa Clara, CA (US); Genya Ishigaki, Richardson, TX (US)

(73) Assignee: TieSet, Inc., Middletown, DE (US)

( * ) Notice: Subject to any disclaimer, the term of this patent is extended or adjusted under 35 U.S.C. 154(b) by 1170 days.

(21) Appl. No.: 17/359,383

(22) Filed: Jun. 25, 2021

(65) Prior Publication Data

US 2021/0406782 A1 Dec. 30, 2021

Related U.S. Application Data

(60) Provisional application No. 63/073,028, filed on Sep. 1, 2020, provisional application No. 63/072,564, filed on Aug. 31, 2020, provisional application No. 63/049,911, filed on Jul. 9, 2020, provisional application No. 63/046,079, filed on Jun. 30, 2020.

(51) Int. Cl.

*G06N 20/20* (2019.01)
*G06F 16/27* (2019.01)
*G06N 3/098* (2023.01)
*G06N 5/04* (2023.01)

(52) U.S. Cl.

CPC ............. *G06N 20/20* (2019.01); *G06F 16/27* (2019.01); *G06N 3/098* (2023.01); *G06N 5/04* (2013.01)

(58) Field of Classification Search

CPC .......... G06N 3/098; G06N 5/04; G06N 20/00; G06N 20/20; G06F 16/27

See application file for complete search history.

(56) References Cited

U.S. PATENT DOCUMENTS 11,544,743 B2 * 1/2023 Jacobs .................. G06N 20/00
11,593,634 B2 * 2/2023 Choudhary ........... G06N 3/084

(Continued)

OTHER PUBLICATIONS

Luo, Siqi et al., HFEL: Joint Edge Association and Resource Allocation for Cost-Efficient Hierarchical Federated Edge Learning, IEEE, Jun. 26, 2020, pp. 6535-6548, (Year: 2020).*

(Continued)

*Primary Examiner* — Matthew Ell
*Assistant Examiner* — Louis Christopher Nye
(74) *Attorney, Agent, or Firm* — KENJA IP LAW PC

(57) ABSTRACT

A system for decentralized federated learning is provided. The system comprises agents and aggregators coupled to a communication network. Each agent comprises a data collector collecting raw data; a memory storing the collected raw data and a local machine learning model; and a processor training the local machine learning model. Each aggregator comprises a model collector collecting the local machine learning models; a memory storing the collected local machine learning models; and a processor creating a cluster machine learning model from the local machine learning models. The aggregators communicate with each other and exchange the cluster machine learning models to create a semi-global machine learning model. Each of the aggregators sends the semi-global machine learning model to the associated agents. Each of the agents updates the local machine learning model with the semi-global machine learning model.

18 Claims, 15 Drawing Sheets

(56) References Cited

U.S. PATENT DOCUMENTS

| | | | | |
|---|---|---|---|---|
| 2019/0156247 | A1* | 5/2019 | Faulhaber, Jr. | G06N 3/045 |
| 2021/0143987 | A1* | 5/2021 | Xu | G06N 20/00 |
| 2021/0250166 | A1* | 8/2021 | Sundaresan | G06N 20/00 |
| 2021/0256309 | A1* | 8/2021 | Huth | G06N 20/00 |
| 2021/0256429 | A1* | 8/2021 | Gilbertson | G06N 20/20 |
| 2021/0304062 | A1* | 9/2021 | Rajamoni | G06N 20/00 |
| 2021/0327562 | A1* | 10/2021 | Kushwah | G06F 18/214 |
| 2022/0343167 | A1* | 10/2022 | Chawla | G06N 3/045 |
| 2023/0044035 | A1* | 2/2023 | Martins | G06N 3/045 |
| 2023/0118025 | A1* | 4/2023 | Reisser | G06N 3/098 |
| | | | | 706/25 |

OTHER PUBLICATIONS

Roy, A. et al., BrainTorrent: A Peer-to-Peer Environment for Decentralized Federated Learning, May 2019, arxiv, pp. 1-9 (Year: 2019).*

Qu, Y. et al., Decentralized Privacy Using Blockchain-Enabled Federated Learning in Fog Computing, Mar. 2020, published in IEEE Internet of Things Journal vol. 7 Issue 6, Jun. 2020, pp. 1-13 (Year: 2020).*

Deng, Y. et al., Adaptive Personalized Federated Learning, Mar. 2020, arxiv, pp. 1-34 (Year: 2020).*

Arivazhagan, M. et al., Federated Learning with Personalization Layers, Dec. 2019, arxiv, pp. 1-13 (Year: 2019).*

* cited by examiner

SYSTEM AND METHOD FOR DECENTRALIZED FEDERATED LEARNING

CROSS-REFERENCE TO RELATED APPLICATIONS

This application claims priority to or the benefit of U.S. provisional Patent Application No. 63/046,079 titled "Horizontally Clustered Federated Learning Platform" filed Jun. 30, 2020, U.S. provisional Patent Application No. 63/049,911 titled "Framework And Methods For Private, Interpretable, And Adaptive Data-Driven Controllers" filed Jul. 9, 2020, U.S. provisional Patent Application No. 63/072,564 titled "System And Methods For Privacy-Protecting Crowdsourced Learning For Robotic Manipulators And Tools" filed Aug. 31, 2020, and U.S. provisional Patent Application No. 63/073,028 titled "Privacy Preserved Framework For Speech Emotion Detection Applications" filed Sep. 1, 2020. The disclosures of the prior applications are hereby incorporated by reference herein in their entirety.

TECHNICAL FIELD

The present disclosure relates generally to machine learning, and more specifically, to a system and method for decentralized federated learning.

BACKGROUND

The recent advancement in Machine Learning (ML) technology has dramatically expanded the potential use of Artificial Intelligence (AI) in our daily lives. Since its beginning, the product-level AI systems have been implemented in a centralized fashion, where a huge amount of data is gathered in data centers and used for creating high-quality AI models.

The traditional big data approach by which a huge amount of data is transferred from users to a centralized computation facility like a data center raises two major concerns for AI to further evolve.

The first concern is the privacy protection of users. In general, users are required to upload their data to the centralized computation facility to receive the benefits of AI technology. This concern of providing raw and personal data to a certain company prevents many application fields from adopting the most advanced technologies. There are also a lot of privacy regulations such as EU General Data Protection Regulation (GDPR) and California Consumer Privacy Act (CCPA) that restrict use of private data of users and consumers. Collecting a huge amount of personal data into one place causes security and compliance issues as well.

The other concern is the heavy communication load caused by transferring data. The AI applications have mainly targeted the fields that analyze huge amounts of texts, speech audio, sensor data, and images. In order to create high performing AI models, there needs to be significant computation resources and data science efforts that are not easily accessible.

To address these concerns, Federated Learning (FL) framework has been developed (e.g., Jakub Konečný, H. Brendan McMahan, Daniel Ramage, & Peter Richtárik, "Federated Optimization: Distributed Machine Learning for On-Device Intelligence," arXiv:1610.02527, 2016). FL is a machine learning paradigm in which multiple clients (e.g., edge devices, separate organizations, etc.) cooperate to learn a model under the orchestration of a central server.

A system architecture that facilitates accommodating more devices in FL has also been proposed (e.g., Keith Bonawitz, Hubert Eichner, Wolfgang Grieskamp, Dzmitry Huba, Alex Ingerman, Vladimir Ivanov, Chloe Kiddon, Jakub Konečný, Stefano Mazzocchi, H. Brendan McMahan, Timon Van Overveldt, David Petrou, Daniel Ramage, & Jason Roselander, "Towards Federated Learning at Scale: System Design," arXiv:1902.01046, 2019). The proposed system deals with the increase in devices by initiating parallel actors controlled by a central coordinator and maintaining the latest model in persistent storage.

Multiple proposals to combine distributed Machine Learning concepts and Edge computing are surveyed in Z. Zhou, X. Chen, E. Li, L. Zeng, K. Luo, & J. Zhang, "Edge Intelligence: Paving the Last Mile of Artificial Intelligence With Edge Computing," Proceedings of the IEEE, 107(8), 1738-1762, 2019.

A collaborative learning mechanism that works in a distributed manner is described in Jeff Daily, Abhinav Vishnu, Charles Siegel, Thomas Warfel, & Vinay Amatya, "GossipGraD: Scalable Deep Learning using Gossip Communication based Asynchronous Gradient Descent," arXiv:1803.05880, 2018.

Also, it is expected that potential application domains shift from static AI to adaptive AI. The definitions of static and adaptive AI are as follows.

Static Artificial Intelligence:

- Models trained in advance with prepared training data
- Comparisons only against the static base model
- Static models are trained for limited set of real world scenarios
- Single model is deployed
- Outdated training samples making conventional training methods inefficient
- Multiple pipelines need to be created for training data collection and insights
- Model review is through a complex manual process
- Model training via pipelines for hundreds of features across various datasets Adaptive Artificial Intelligence

- Models self-trained at distributed learning environment with newer real-time data
- Continuous comparisons of performance of AI models
- AI models can be cross-trained based on difference in learning from peer models
- A model federation process is deployed
- Continuous learning process with agile AI training leads to better performance
- Learns new observations while working on older predictions, keeping the processes updated in real time
- Model review automation with key model parameters
- Models are trained via streaming, efficient for sparse datasets
- More predictable time to market

SUMMARY

Current static AI frameworks will not adapt to the rapid changes of environments and AI models get outdated and drifted easily. This problem is significant where the accuracy of AI applications matters such as medical applications. Therefore, there has been a demand for an adaptive learning framework capable of achieving transition from static AI to adaptive AI.

Moreover, potential AI applications need to adapt a number of distributed devices generating a huge amount of data as well as continuous and adaptive learning frameworks.

One aspect of the present disclosure is directed to a system for decentralized federated learning, comprising:

a data collector collecting raw data;

a memory storing the collected raw data and a local machine learning model; and a processor training the local machine learning model by using the collected raw data to update the local machine learning model, and multiple aggregators coupled to the communication network and each uniquely associated with the agents, each aggregator comprising a model collector collecting the local machine learning models from the associated agents;

a memory storing the collected local machine learning models; and a processor creating a cluster machine learning model from the collected local machine learning models, wherein the aggregators communicate with each other and exchange the cluster machine learning models to create a semi-global machine learning model, each of the aggregators sends the semi-global machine learning model to the associated agents, and each of the agents updates the local machine learning model with the semi-global machine learning model received from the associated aggregator.

The system may further comprise a distributed database storing the local machine learning models, the cluster machine learning models created by the aggregators, and the semi-global machine learning model, wherein the distributed database identifies each of the local machine learning models, the cluster machine learning models and the semi-global machine learning model by a globally unique hash value.

Each of the local machine learning models, the cluster machine learning models, and the semi-global machine learning model on the distributed database may have meta information, so that the models are searchable by specifying queries.

In one embodiment, performances of the local machine learning models, the cluster machine learning models, and the semi-global machine learning model are constantly evaluated and visualized on graphical user interface of the agents.

In addition, at least one of the agents may utilize a neural network to train the local machine learning model and the neural network comprising an embedding block taking a state of the local machine learning model as an input and converts it into a common representation by accounting for heterogeneity of the local machine learning model, an inference block using the common representation of the input to produce an output, and a transfer block converting the common representation of the output into an output value.

At least one of the aggregators may comprise an agent simulator configured to test at least one of the local machine learning models, the cluster machine learning model, and the semi-global machine learning model to verify a validity of the tested machine learning model.

In one embodiment, the aggregators may form groups, and the groups of the aggregators communicate with each other periodically to exchange the semi-global machine learning models to create a global machine learning model.

In this case, the system may further comprise a model repository storing the global machine learning models previously created by the system and meta-data indicating tasks used for training the respective global machine learning models, wherein at least one of the aggregators, upon receiving a new task from one of the associated agents, computes similarity distances between the tasks used for training the global machine learning models stored in the model repository and the received new task and updates the semi-global machine learning model with the global machine learning model having a smallest similarity distance.

At least one of the agents may generate a personalization rate within a range from more than 0 to less than 1; perform a given number of gradient descents for the global machine learning model, local machine learning models and the personalization rate; obtain a personalized machine learning model by combining the local machine learning model, and the global machine learning model with using the personalization rate, where the personalization rate measures an extent to which the personalized machine learning model mixes the local and the global machine learning models; test the personalized model to check whether a certain performance criteria is met; and, when the performance criteria is met, output the global machine learning model as the personalized machine learning model.

In the system according to the present disclosure, the agents may retain the raw data and send only the trained local machine learning model to the aggregators.

Another aspect of the present disclosure is directed to a computer-implemented method for decentralized federated learning, comprising:

collecting, by multiple agents, raw data;

training, by the agents, local machine learning models by using the collected raw data to update the local machine learning models;

collecting, by multiple aggregators, the local machine learning models;

creating, by the aggregators, cluster machine learning models from the local machine learning models;

exchanging the cluster machine learning models between the aggregators to create a semi-global machine learning model;

sending, by the aggregators, the semi-global machine learning model to the associated agents; and updating, by the agents, the local machine learning models with the semi-global machine learning models received from the associated aggregators.

The computer-implemented method may further comprise storing the local machine learning models, the cluster machine learning models created by the aggregators, and the semi-global machine learning model; and identifying each of the local machine learning models, the cluster machine learning models and the semi-global machine learning model by a globally unique hash value.

Each of the local machine learning models, the cluster machine learning models, and the semi-global machine learning model on the distributed database may have meta information, so that the models are searchable by specifying queries.

The computer-implemented method may further comprise constantly evaluating performances of the local machine learning models, the cluster machine learning models, and the semi-global machine learning model; and visualizing the evaluated performances on graphical user interface of the agents.

At least one of the local machine learning models may be trained by using neural network comprising an embedding block taking a state of the local machine learning model as an input and converts it into a common representation by accounting for heterogeneity of the local machine learning model, an inference block using the common representation of the input to produce an output, and a transfer block converting the common representation of the output into an output value.

The computer-implemented method may further comprise testing, by the aggregators, at least one of the collected local machine learning models, the cluster machine learning models, and the semi-global machine learning model to verify validities of the collected local machine learning models.

The aggregators may form groups, and the groups of the aggregators communicate with each other periodically to exchange the semi-global machine learning models to create a global machine learning model.

The computer-implemented method may further comprise storing the global machine learning models previously created by the system and meta-data indicating tasks used for training the respective global machine learning models; inputting a new task by a user; computing, by the aggregators, similarity distances between the tasks used for training the global machine learning models stored in the model repository and the new task; and updating, by the aggregators, the semi-global machine learning model with the global machine learning model having a smallest similarity distance.

The computer-implemented method may further comprises generating a personalization rates within a range from more than 0 to less than 1; performing a given number of gradient descents for the global machine learning model, local machine learning models, and the personalization rate; obtaining a personalized machine learning model by combining the local machine learning model and the global machine learning model with using the personalization rate, where the personalization rate measures an extent to which the personalized machine learning model mixes the local and the global machine learning models; testing the personalized model to check whether a certain performance criteria is met; and outputting, when the performance criteria is met, the global machine learning model as the personalized machine learning model.

In the computer-implemented method according to the present disclosure, the agents may retain the raw data and send only the trained local machine learning model to the aggregators.

According to the system and method of the present disclosure, at least one of the following benefits can be achieved.

Privacy-preserving: The privacy concern of collecting raw data in a central place is a big hurdle to deploy advanced AI systems. The present system and method naturally resolve privacy problems as only machine learning models are collected through the system of the present disclosure.

Scalability: The expected increase in the number of devices and the amount of data require scalable AI systems that can handle more communication and computation loads. The realization of scalability could raise the following three fundamental issues.

Robustness: It is necessary for those AI systems to cope with the adversarial participants to prevent system-wide service degradation.

Failover: The scalability of such systems is only possible when they can recover seamlessly from failures of some system components.

Mobility: It could be expected to have more diverse devices in the scaled AI systems that are not constantly connected to the systems. Maintaining the intermittent participation of such devices would be another challenge.

Traceability: An additional requirement of large-scale AI systems is the accountability of decisions made by the learning. As the scale of systems expands, it is crucial to keep track of the learning history (aka. Performance of machine learning models) to verify the decisions to prevent blackbox of AI.

Adaptability: Adaptive AI basically supports continuous learning and prevents machine learning models from getting drifted or outdated. AI constantly needs to evolve and the system of the present disclosure is designed to adapt dynamic AI models that are constantly updated at the distributed edge side and aggregate the updated models from distributed learning environments.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
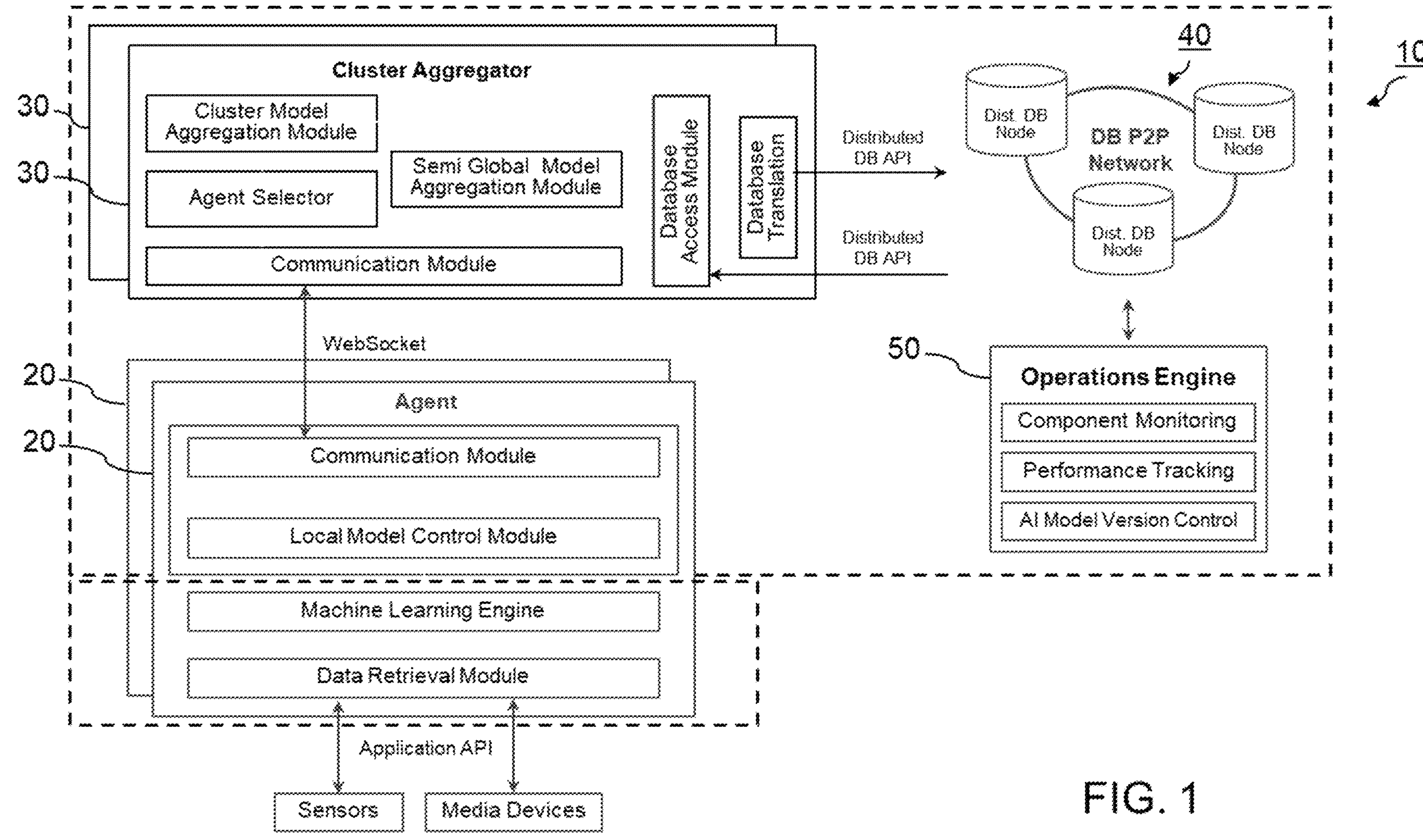
FIG. 1 is a schematic diagram of a system for decentralized federated learning according to an embodiment of the present disclosure.

Embodiments will now be described with reference to the accompanying drawings.

A. Scalable Decentralized Federated Learning System

A1. a Novel Architecture with Decentralized Federation of Cluster Models

The present disclosure is based on two crucial ideas: (1) Clustered model aggregation conducted between a cluster aggregator and agents and (2) Global model synthesis, which approximate a global model, among a group of the cluster aggregators through periodical communications. The approximated global model created through this global model synthesis process is called a semi-global model. The term "cluster aggregator" or "CA" or "server" as used herein means a system that aggregates, via a communication network, artificial intelligence (AI) models that are trained at multiple agents (defined below) and creates a cluster machine learning model from the aggregated AI models. The aggregator serves as a federated learning (FL) server. The term "agent", "device", or "client" as used herein means a system with distributed learning environment such as local edge server, device, tablet, among others, in order to train machine learning models locally and send them to an associated aggregator.

Multiple cluster aggregators are coupled via the communication network to form a group of cluster aggregators and exchange their cluster machine learning models with each other to create a semi-global machine learning model. The group of cluster aggregators communicate with other group(s) of aggregators periodically to exchange their semi-global machine learning models to create a global machine learning model. This communication enables each user to utilize the training results of the users in other groups by receiving a most-updated AI model that approximates a consistent global AI model.

A benefit of this architecture is that each user can protect their privacy by sending a locally trained model to the aggregator instead of raw data. Another advantage is the reduction of communication load by exchanging models that are much lighter than a set of raw data. Furthermore, the gradual formation of the global model using the multiple semi-global models, which are independently commutable in each cluster aggregator, improves the robustness of the entire system and accommodates additional mobility of users by its distributed architecture. Furthermore, the system of the present disclosure provides the accountability of the model updates by storing historical model data in a data-driven distributed database that works with Blockchain or InterPlanetary File System (IPFS).

The scalability aspect including robustness, failover, and mobility is realized by the addressing and delegation mechanism among the cluster aggregators. The global addressing of the devices enables the system to monitor, delegate, and redirect requests from devices. In particular, data storage that stores the uploaded models and cluster aggregation functions is decoupled. This achieves the stateless aggregators, which makes management easier, at the network edge.

FIG. 1 illustrates a schematic diagram a system for decentralized federated learning according to an embodiment of the present disclosure. Each agent 20 belongs to a cluster that is managed by a cluster aggregator (CA). The client uploads a machine learning (ML) model trained by its own local data to the corresponding CA 30 where a model aggregation algorithm is performed to create a cluster model. Each CA 30 stores the cluster model in a distributed database. The CAs communicate with each other to know the cluster models created by other CAs 30 by periodically pulling the models from the databases. A semi-global ML model is synthesized at each CA 30 by aggregating the pulled models. This two-step model aggregation coordinated in a distributed manner realizes the key system requirements discussed above.

(ii) Distributed Database

In addition, a distributed database 40 such as InterPlanetary File System (IPFS) or Blockchain collaboratively guarantees the accountability of the global model updates. When a cluster aggregator 30 synthesizes a semi-global model using a subset S of cluster models, which are created by other cluster aggregators 30, the CA 30 stores the semi-global model in a distributed database that manages the model information with a unique data identifier. The key functionality is to maintain all models (including both semi-global and cluster models) in a referable way where each model is identified by a globally unique hash value. This may be implemented based on the concept of Chord DHT (Stoica, I., Morris, R., Liben-Nowell, D., Karger, D., Kaashoek, M., Dabek, F., & Balakrishnan, H. (2003). Chord: A Scalable Peer-to-Peer Lookup Protocol for Internet Applications IEEE/ACM Trans. Netw., 11(1), 17-32) or InterPlanetary File System (Juan Benet. (2014). IPFS—Content Addressed, Versioned, P2P File System). Simultaneously, the CA 30 pushes a triple of timestamp, the hash model identifier, and the synthesized model identifiers in S into a Blockchain block. The lightweight triple in a block becomes eventually incorruptible and provides accountability on model synthesis. For example, it is possible to identify a set of aggregators providing harmful cluster models based on the information about S once malfunctions of semi-global models are detected.

The system 10 according to the present disclosure stores all the volatile state information of the system 10. A failure of a cluster aggregator is restorable based on a state snapshot stored in the database. In addition, aggregators exchange their cluster models through the database 40. Therefore, the database 40 stores the mapping between each cluster model and an aggregator that created the model. Also, it stores the meta-information of models such as model generation time, the size of training samples, task type.

(iii) Operations Engine

Hereinafter, key important features of the operations engine 50 of the system 10 are discussed.

a) Systems Monitoring and Diagnosis

In the database system, the system state and communication status of database servers, cluster aggregators 30, and agents 20 are constantly logged and kept track of For example, if one of the agents 20 is disconnected from respective one of the aggregators 30, the operator of the system 10 can see this dynamic status of disconnected agent state.

b) Visualization of Model Information

Performance of the local ML models, cluster models, and global models is uploaded to the database system together with the models themselves. Operators can constantly keep track of the performance of all the models so that he or she can pick up the better performing models at any time. The model performance is visualized through the GUI implemented on the system 10.

c) Model Repository Management & Version Control

The database 40 of the system 10 collects many ML models from a variety of applications domains, which forms a Zoo of ML models. Each model has meta information and so that model search function is possible by specifying queries such as model type, application category, date and time, skill, etc. Upload and download functions are also implemented for users to be able to utilize the useful ML models for their applications. The advanced model management framework will be discussed later.

A2. Asynchronous Agent Participation in Federated Learning

Figure 2:
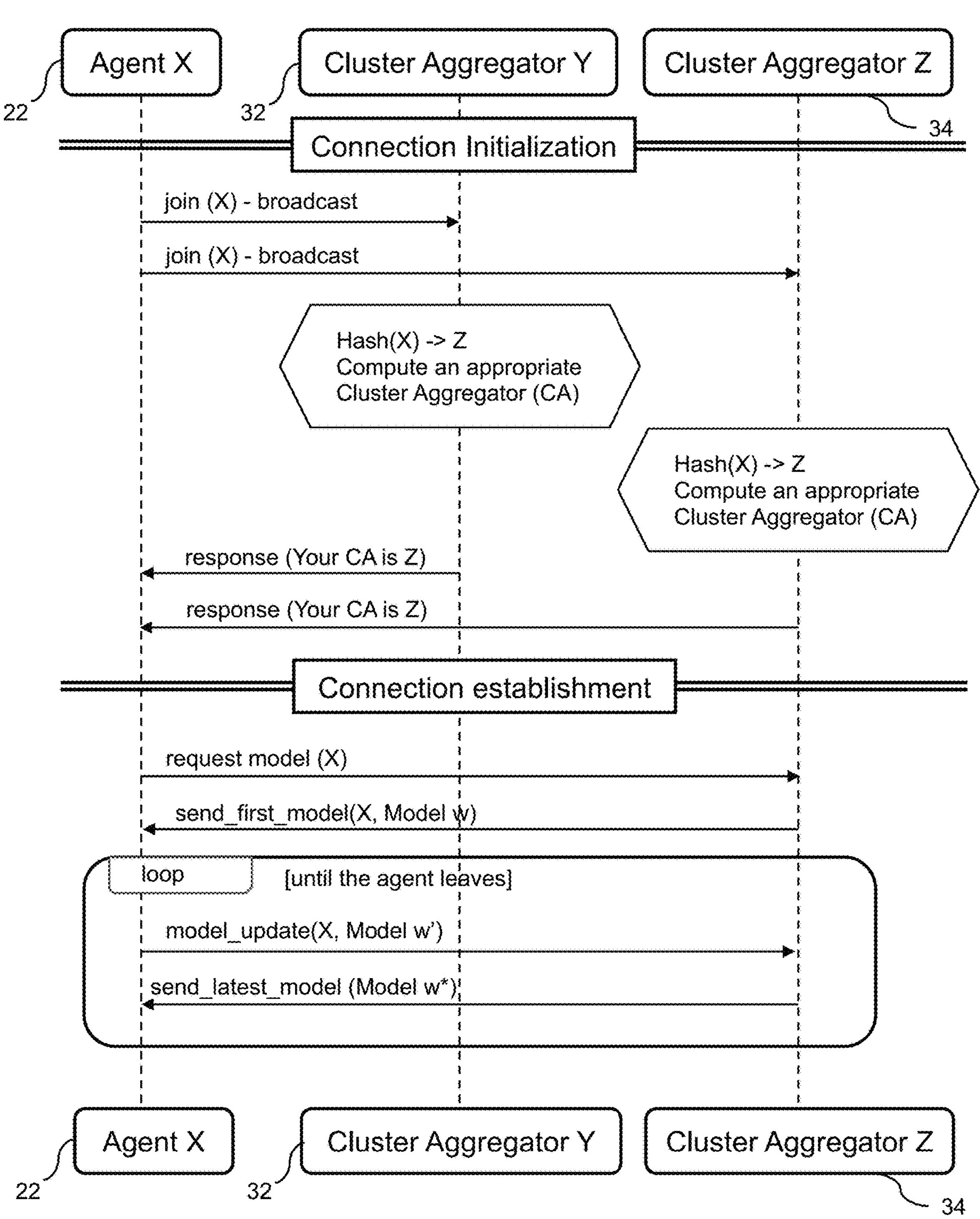
FIG. 2 illustrates communications between a user agent and a cluster aggregator.
Figure 3:
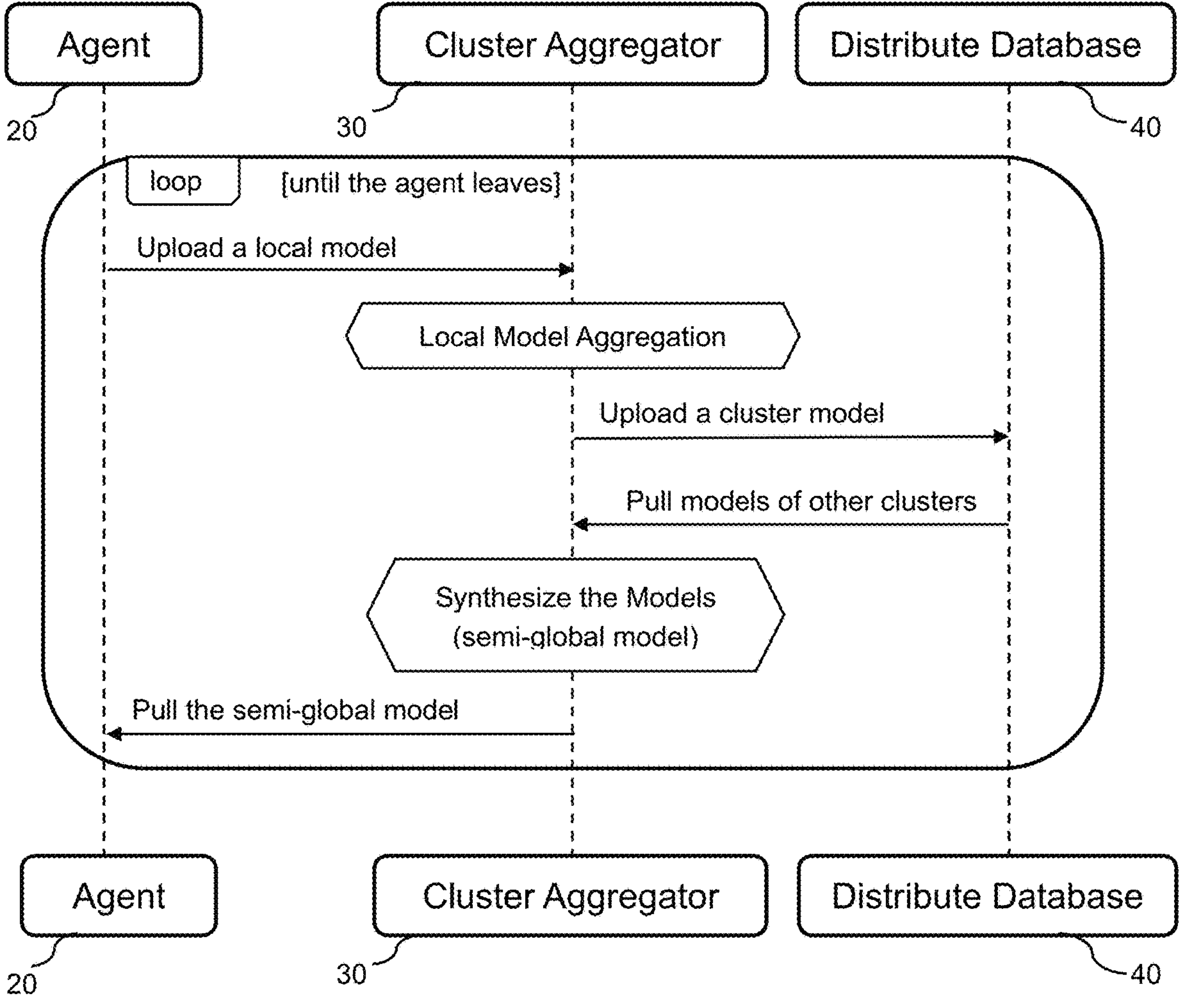
FIG. 3 illustrates a detailed sequence of a model update process.

FIG. 2 describes the communications between a user agent and a CA. When a user agent 22 decides to join the FL system, it broadcasts join messages, which contain a user's unique ID, to the system (all CAs 32, 34). CAs 32, 34 have a common hash function that returns a CA 34 to which the agent should belong. After knowing a specific CA 34, the agent 22 requests a base ML model, which it starts training. The local model upload and semi-global model acquaintance continue until the agent leaves the system. The detailed sequence of the model update process is illustrated in FIG. 3.

A3. Semi-Global Model Synthesis

Figure 4:
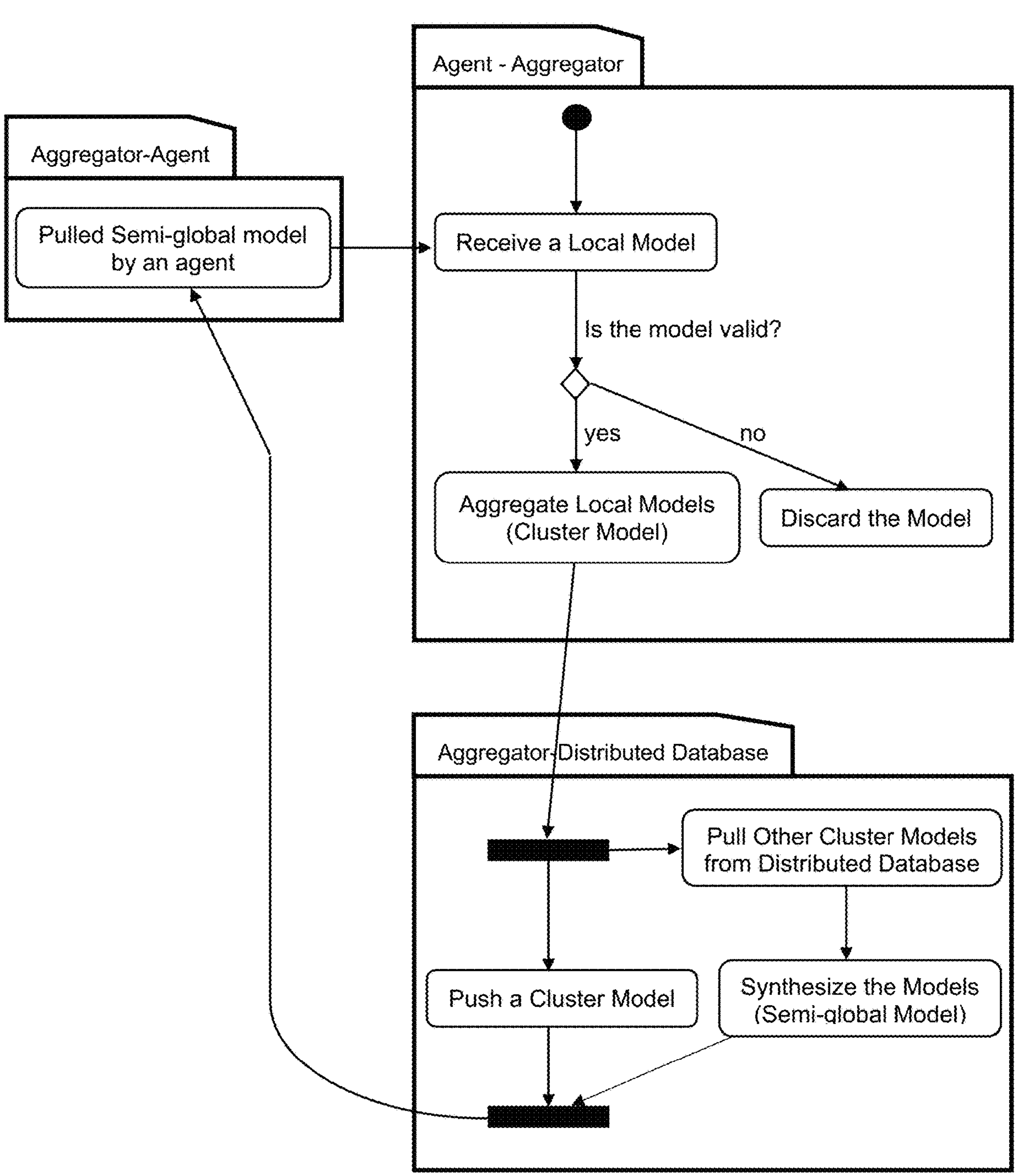
FIG. 4 shows a state transition of a cluster aggregator.

FIG. 4 shows the state transition of a CA. When receiving a local model from an agent, the CA judges if it should accept the model. This judgment could be conducted from many different aspects such as security and update relevance. A cluster model is formed by aggregating all the accepted models. The CA pushes the cluster model into a database and simultaneously accesses some databases to retrieve cluster models formed by other CAs. A semi-global model, which will be used in the agents belonging to the CA, is synthesized from the cluster models.

Additionally, when an aggregator forms a semi-global model, it does not need to retrieve the models from all aggregators. The present inventors' approach is to create a semi-global model, which would converge to the global model eventually, based on some models randomly selected by each aggregator. This approach enhances the robustness and independence of aggregators by compromising to obtain the exact global model at every update. This also contributes to mitigating the computation and communication bottleneck that could be observed in centralized or fully synchronized FL systems.

A4. Intermediate Agent for Devices with Low Computational Capability

Figure 5:
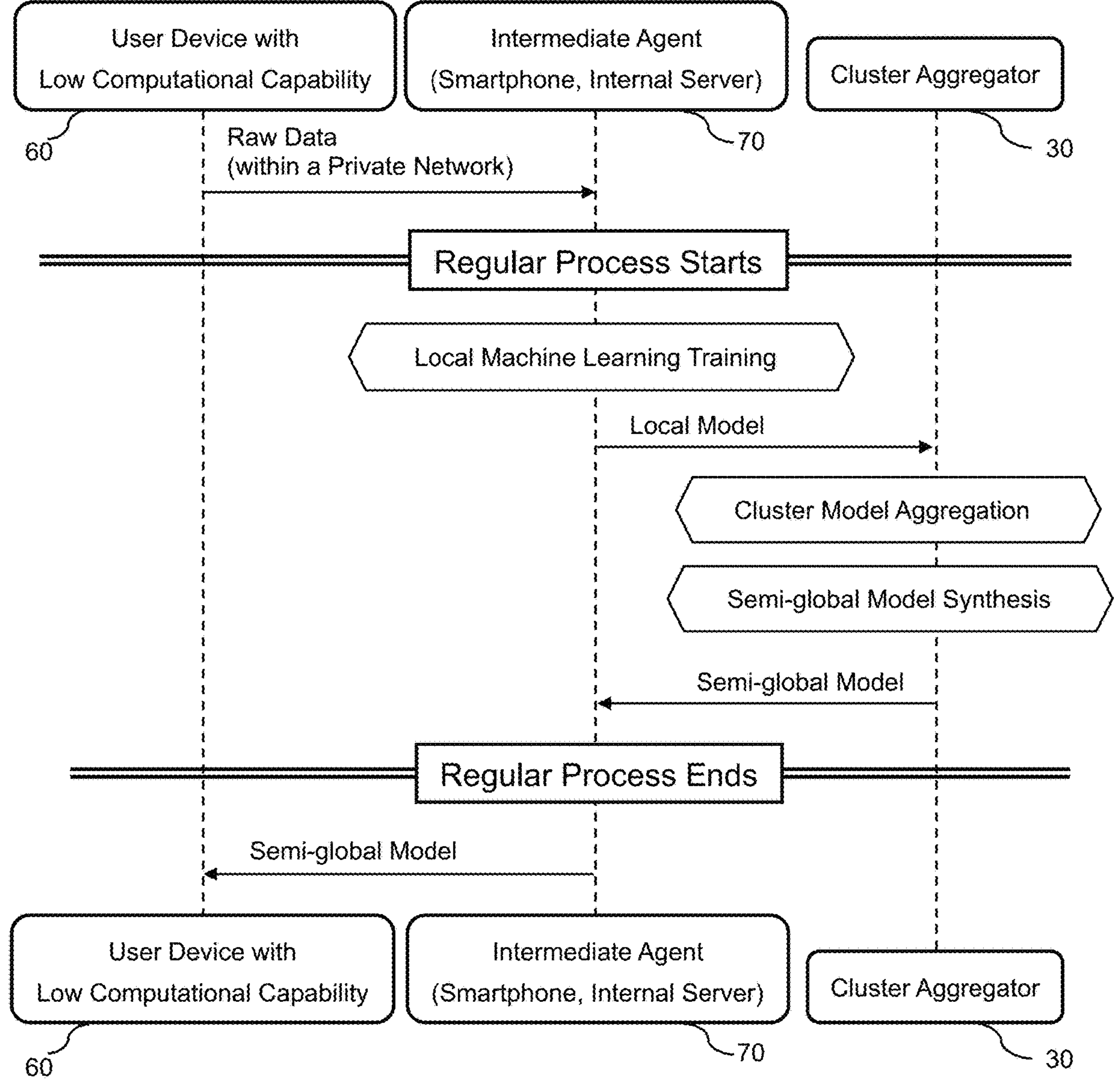
FIG. 5 illustrates a general relationship among cluster aggregators, intermediate agents, and user devices.

When the computational capability of user devices 60 is limited, the system of the present disclosure may include an additional layer with intermediate agents 70 such as smartphones and local servers. For example, when users are tracking their health information on their smartwatches, they can transfer the raw data to their smartphones or tablet devices where the FL agent application can run. In this embodiment, the intermediate agents 70 play the role of FL agents described above. Therefore, the interactions between the aggregators 30 and the intermediate agents 70 stay the same, while implementing an application-level interface between the user devices 60 and the intermediate agents 70. FIG. 5 illustrates a general relationship among the three stakeholders: aggregators 30, intermediate agents 70, and user devices 60.

B. Agent-Side Adaptive Federal Learning Framework

B1. Agent-Side Adaptive Learning Controller

Figure 6:
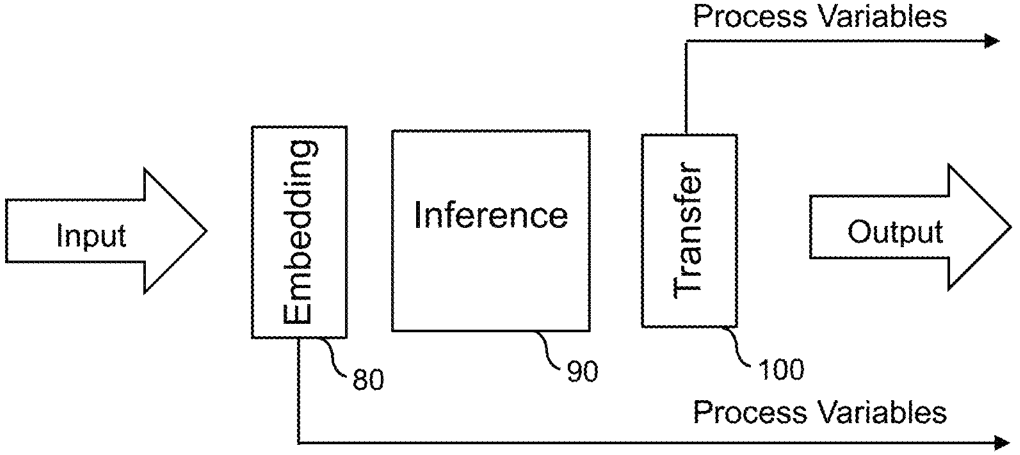
FIG. 6 illustrates an architecture of a neural network.

To further enhance the adaptability and interpretability, a configuration mechanism for users' ML models is provided. FIG. 6 illustrates the architecture of a neural network configured for this purpose. The network comprises three sequentially connected blocks of layers. (a) The embedding block 80 takes the process model state as an input and converts it into a common representation by accounting for the heterogeneity of process models. The embedding block 80 additionally predicts process variables that are not part of the process state but can be descriptive of the process performance and other metrics that an operator cares about. Such variables are determined by each agent's operator. (b) The inference block 90, whose parameters are aggregated through the federated learning process, uses the common representation of the input to produce an output. Since the inference block 90 is agnostic to process model variations, it can be generated by aggregating inference blocks 90 across the network. (c) The transfer block 100 converts the common representation of the output into an output value understood by the particular process model. The transfer block 100 can also predict process variables aside from ones assigned to the embedding block 80. Process variables are used by inference and transform blocks 80, 90 to calculate the output.

Figure 7:
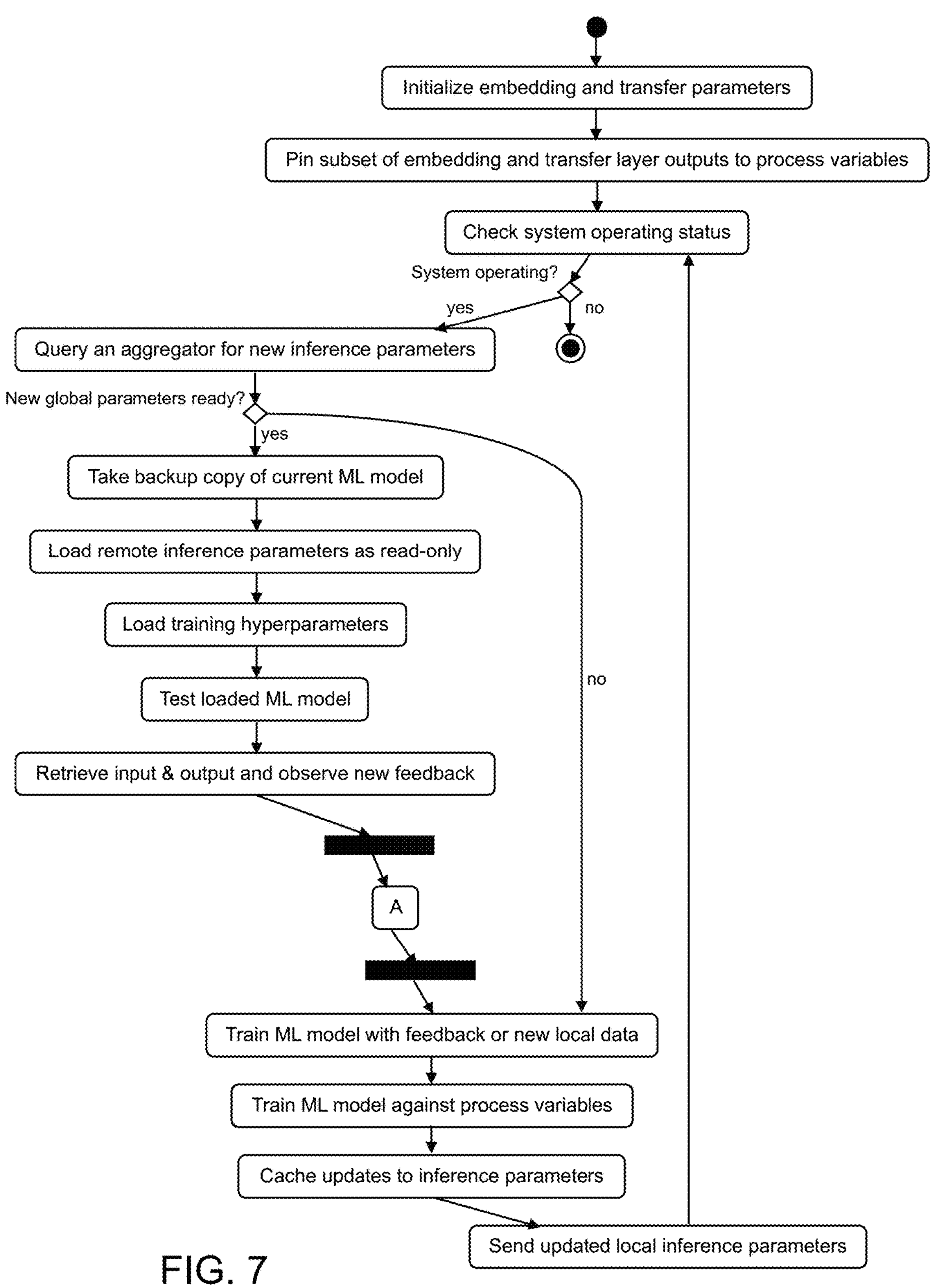
FIG. 7 illustrates an algorithm used by the controller function.

Along with the specifically configured model, the agent-side application has a controller function. The algorithm used by the controller function is described in FIG. 7. (1) The controller initializes its copy of embedding and transfer block parameters. (2) Some nodes of the embedding and transfer layers are designated to predict various process variables. Such designations can vary by each controller instance. (3) The controller queries the aggregator for updates to the inference parameters (also known as ML model exchanged between the aggregator and agent). If available, the controller downloads the federated inference parameters that have been updated by the aggregator. These parameters are kept-read only, but attempted changes to them during training are cached. (4) The controller feeds the input of the process model to its ML model and calculates an output. It stores the new input and the feedback from the process. (5) The stored interactions or new data are used to train the model. However, only the parameters of the embedding and transfer layers are changed. (6) During the training of the model, an additional optimization objective is added for the prediction error for the process variables. The model is trained to optimize its performance and process variable prediction objectives. (7) Updates to be made to the inference layer are cached so they can be sent to the aggregator when a new update to the inference block is ready. (8) The agent sends back its updated inference parameter updates to an aggregator.

B2. ML Model Interpretation Based on Deviation from Baseline Outputs

Figure 8:
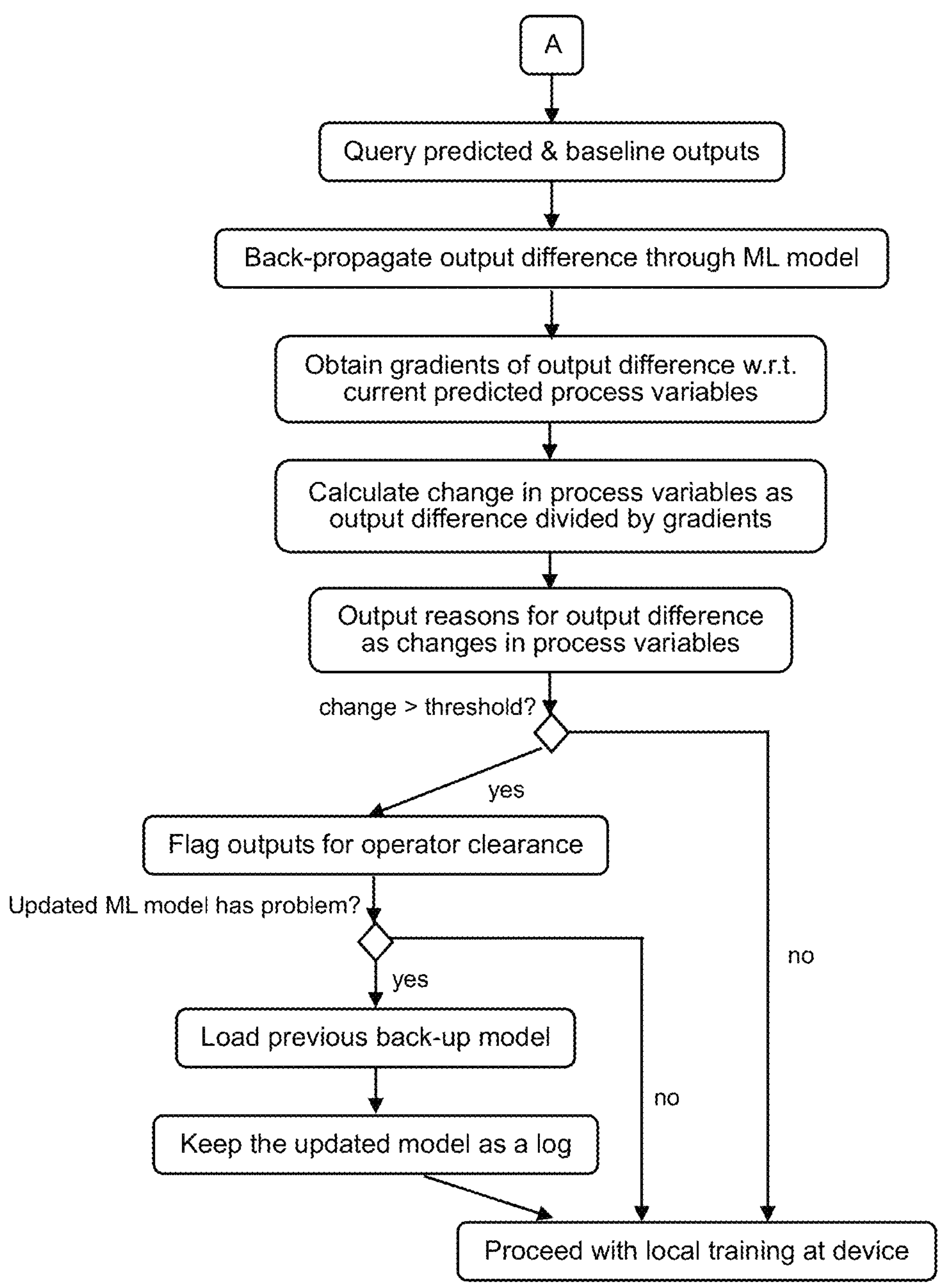
FIG. 8 illustrates an algorithm used for an interpretation about an output chosen by each user model.

When the agent-side application is configured in this way, we can provide an interpretation about an output chosen by each user model, using the following algorithm (FIG. 8). (1) Get the most recent output taken by the controller. Also, get a baseline output for that time. A baseline output can be a safety reference point set by the operator, an average of a past window of outputs or results, or outputs recommended by a secondary expert/rule-based controller. (2) The difference of the output with respect to the baseline is back propagated through the neural network or control policy. (3) Gradients accumulated at agent nodes representing process variables and inputs are collected. (4) The change in either process variables or inputs is defined as the output difference divided by the gradient of that agent node. (5) The change represents how much that particular process variable has to change to reconcile the difference between the output and the baseline. The individual reconciliatory differences are presented to the operator via visualizations to explain the rationale of the neural network. (6) If a change in a process variable exceeds some operator-specified threshold, a further alarm signal can be raised to indicate a fault in the system or an anomalous state of the ML model.

B3. User Interface for Traceability and Controllability of ML Models

The system includes a User Interface (UI) that provides a service provider/operator with 1) monitor and control capability of Federated Learning processes, 2) access to the state information of each aggregator and the distributed database, 3) usability to set and update the configuration of each aggregator, 4) performance tracking of local, cluster and global ML models, and 5) the transition of the weight parameters of user models. This enables service providers to identify a potential issue with a specific user or model when observing a degradation in the performance of a global model.

B4. Agent Simulator for Model Validation

When applying the present disclosure to certain areas where model validation is required such as safety-sensitive fields including healthcare and medical applications, an agent simulator is attached to each aggregator as one of the agents. In this sense, we can consider the agent simulator as a virtual agent (user) for model validation, which is treated as an internal process of an aggregator. An aggregator tests an aggregated model using the agent simulator to verify the validity of the newly aggregated model. Inside the agent simulator, we set a specific threshold and exhaustive test cases to satisfy verification criteria. An aggregator sends out the models that passed the validation phase on the agent simulator to actual user devices.

C. Advanced Machine Learning Model Version Control & Management

Basically, the distributed database stores all the local models sent from agents, cluster models, and (semi-) global models aggregated by cluster aggregators, so that management and version control of models are also implemented.

The ML model version control and management framework according to the present disclosure supports advanced features of transfer, meta, continuous, multi-task, and personalized learning, all of which are necessary for supporting high level AI production and operations.

C1. Crowdsourced Model Repository for Transfer Learning and Meta-Learning

The system and the method of the present disclosure supports the reuse of stored Machine Learning models (TL: Transfer Learning) and the synthetic initialization based on stored ML models for a new but similar task (Meta-Learning). Transfer learning aims at improving the performance (accuracy and/or training time) of target learners on target domains by transferring the knowledge contained in different but related source domains. Meta-learning, or learning to learn is simply learning from prior experience with other tasks by exploiting similarity between tasks. During meta-learning, the model is trained to learn tasks in the meta-training set. There are two optimizations at play—the learner, which learns new tasks, and the meta-learner, which trains the learner. Methods for meta-learning have typically fallen into one of three categories: recurrent models, metric learning, and learning optimizers.

This feature is enabled by implementing a model repository that stores the pre-trained and newly synthesized ML models for specific tasks with the meta-data indicating the usage of the models. Along with the repository, the Model Selector function, which handles the pulls and pushes of ML models based on the users' requests, is added inside of an aggregator. In this context, the global models stored in the repository is referred to herein as Crowdsourced Global Manipulation Model (CGMM).

C2. Model Selector for Transfer & Meta Learning Using Metadata of Models

Figure 9:
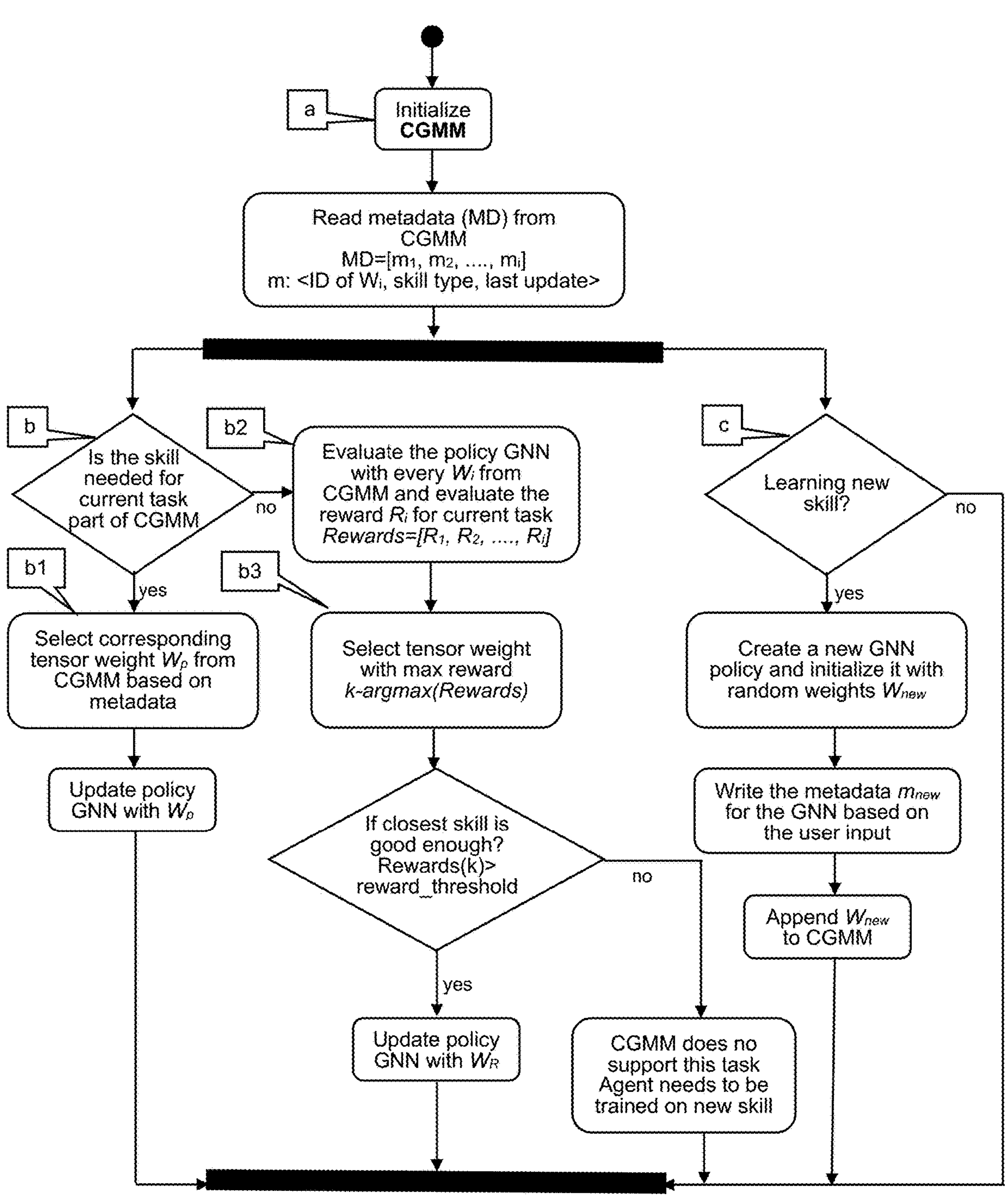
FIG. 9 illustrates a state transition of the Model Selector function in an aggregator to handle CGMM repository.

FIG. 9 describes the state transition of the Model Selector function in an aggregator to handle CGMM repository. (a) The Model Selector process starts by reading the CGMM and its metadata file. The metadata contains information for each model. This information includes the ID number, the description of the skill, and the date and time of when the model was last trained or updated. The Model Selector includes two subprocesses that run in parallel: (b) This subprocess is in charge of checking whether or not the skill needed for the current task defined by the user is included in the CGMM, if so (b1) it selects the corresponding weight tensor and updates the Generic Neural Network (GNN) with its values. If CGMM does not have a GNN that has been explicitly trained for the desired skill, (b2) the subprocess evaluates the model with every weight tensor in CGMM. This evaluation consists of the agent performing the desired task in the environment and computing its performance or total reward. The tensor weight that produced the highest performance is selected, and (b3) is compared with the reward threshold which is the minimum expected performance or reward defined by the user to define if a task has been successfully performed. If the model is good enough at solving a task, it is updated with its value, otherwise, the agent selector sends a "non-skill supported at the moment" message to the user. (c) This subprocess checks whether or not the agent has been instructed to learn a new skill or task. If so, it creates a new randomized weight tensor for the GNN and appends the model and its metadata to CGMM.

Figure 10:
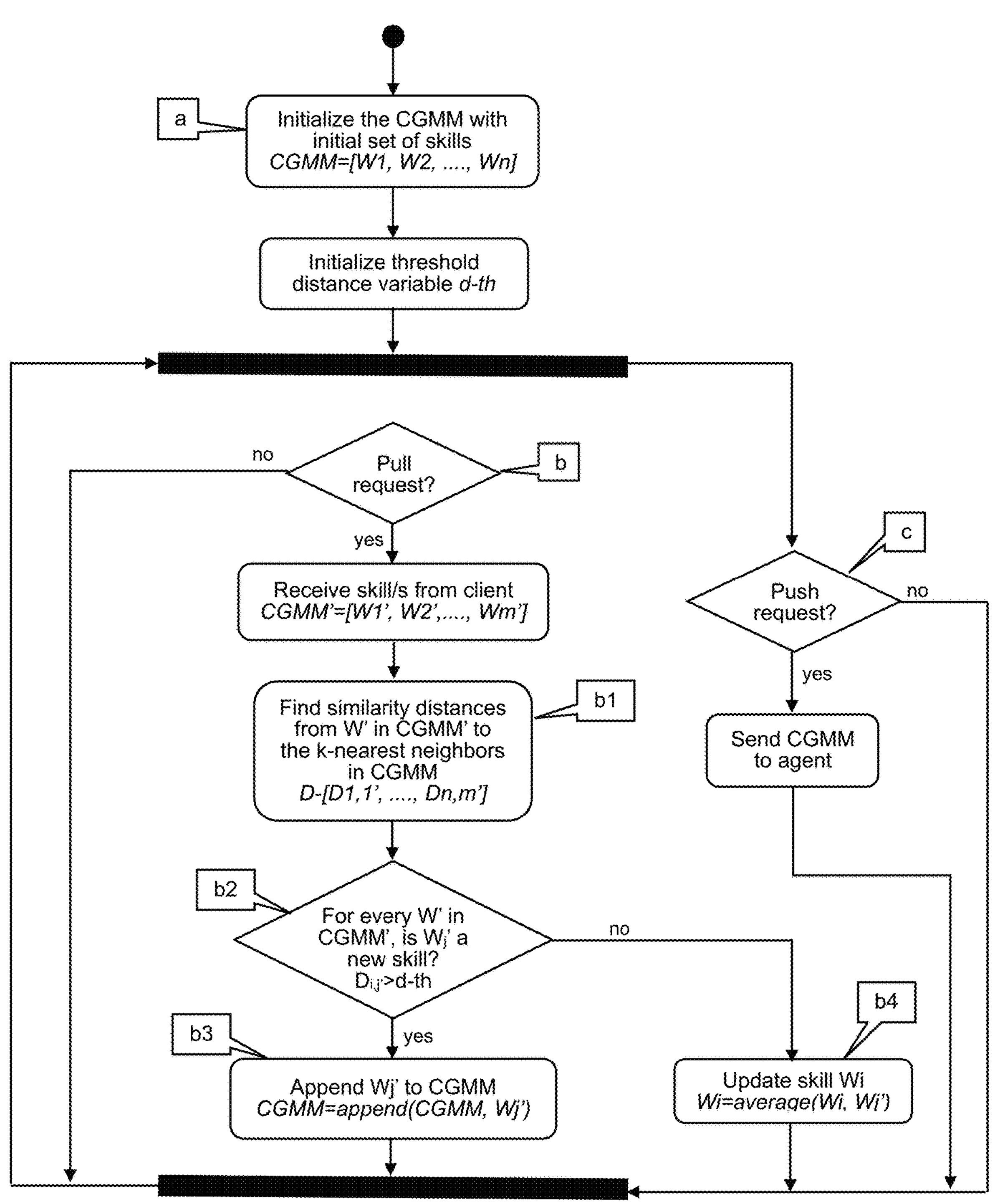
FIG. 10 illustrates a way that an aggregator computes the similarity between models to identify the existing models to be used for TL or Meta-Learning.

FIG. 10 illustrates a way that an aggregator computes the similarity between models to identify the existing models to be used for TL or Meta-Learning. (a) The aggregator starts by initializing the initial set of skills in CGMM and the similarity threshold distance d-th. (b) This subprocess handles the pull request and its functionality is based on a similarity distance. The similarity distance is a pseudo-metric that measures the similarity between two skills encoded by a tensor weight (ie. Wi and Wj'). In this context, d-th defines an n-dimensional sphere in the multidimensional tensor space in which a skill j' defined by the tensor Wj' is considered a variation of and similar to the skill i with tensor Wi if it resides inside the sphere with center at Wi. When a pull is requested, this subprocess receives an incoming Crowdsourced Global Manipulation Model from the client CGMM' and (b.1) computes the similarity distances D from every tensor weight Wj' in CGMM' to the k-nearest neighbor tensors in CGMM. Then, the subprocess checks (b.2) if a tensor Wj' can be considered a new skill or in other words when Wj' does not reside inside of any of the spheres with center at W1, W2, . . . , Wn. If Wj' is a new skill (b.3), Wj' is appended to the global model at the server CGMM. Otherwise (b.4), when Wj' is considered similar or a variation of a previously learned skill Wi, Wi gets updated with Wj' to improve the skill performance. This update can be a simple average or any other function that takes into account the new information from Wj' to update Wi. (c) This subprocess handles the push request from the agent and simply sends the Crowdsourced Global Manipulation Model CGMM to the agent.

Figure 11:
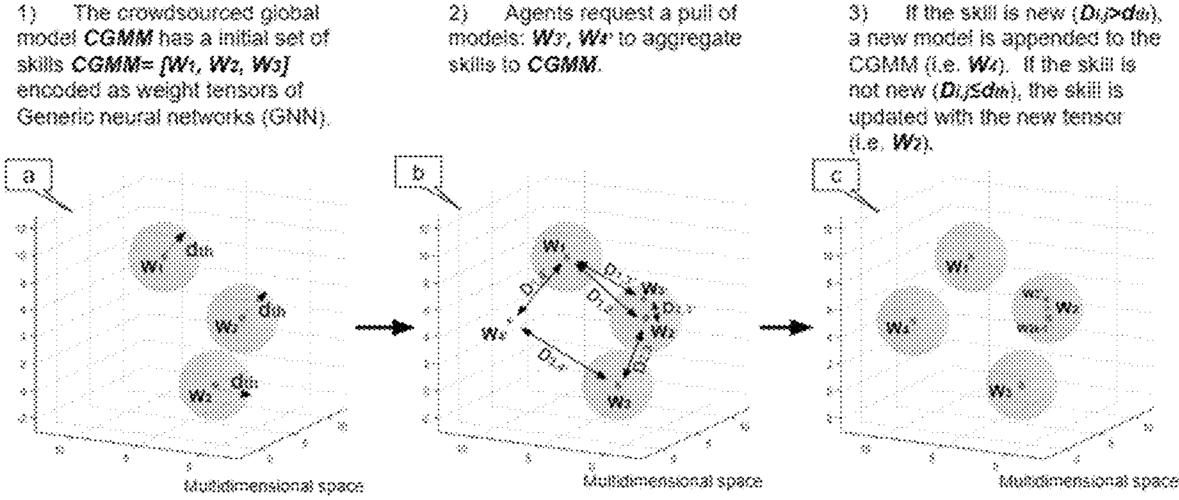
FIG. 11 exemplifies the aggregator's internal computation corresponding to a pull request from an agent.

FIG. 11 exemplifies the aggregator's internal computation corresponding to a pull request from an agent. It shows updating and appending two skills encoded by tensor weight W3' and W4' to the CGMM which contains a set of initial skills encoded as W1, W2, W3. The process starts (a) with a set of initial skills from CGMM=[W1, W2, W3]. When the agent requests a pull and sends its models CGMM'=[W3', W4'] to the aggregator, the aggregator situates W3', W4' in the tensor weight space and computes the distance to the k-nearest neighbors (here k=2) (b). As skill W4' resides outside all the n-dimensional spheres (D<dth for all Di,j), it is then considered a new skill and it's appended to CGMM which becomes CGMM=[W1, W2, W3, W4]. (c) The skill encoded by W3' resides inside the n-dimensional sphere with a center at W2, so it is considered by the aggregator as a variation or similar to skill W2. In consequence, it updates the weight of W2 by taking the average between W2 and W3'.

Figure 12:
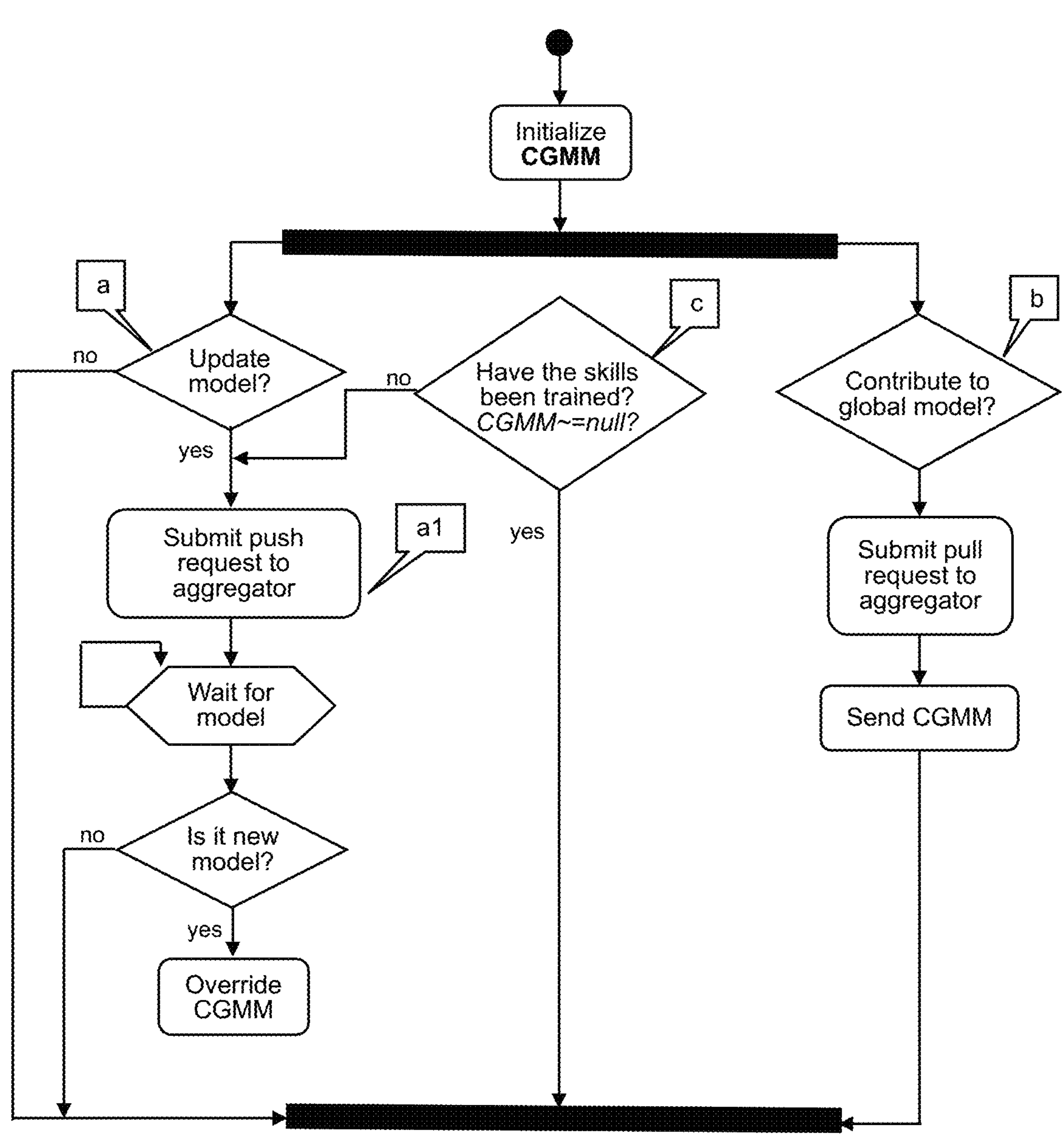
FIG. 12 shows the state diagram of an agent that requests a TL or Meta-Learning model to an aggregator.

FIG. 12 shows the state diagram of an agent that requests a TL or Meta-Learning model to an aggregator. The agent starts by initializing the CGMM model. It hosts 3 subprocesses for submitting a push, submitting a pull request, and checking whether or not there are skills trained. (a) This subprocess submits a push request to the aggregator if the user decides to update the current model CGMM that the agent has locally stored. (al) After submitting the push request, the subprocess waits to receive the model. Once received, it checks if it's a newer version than the currently stored CGMM, if so it overrides CGMM otherwise it does nothing. (b) This subprocess submits a pull request to the aggregator if the user decides to contribute to the global model. After submitting the request, the subprocess sends the currently stored CGMM. (c) This subprocess checks if the current model CGMM is empty or in other words if there are no trained skills. If CGMM is empty, it submits a push request and continues the process as previously explained in (al). In the other case, when skills have been trained, the subprocess does nothing.

C3. ML Model Management for Personalization

The system may include a personalized learning module that improves the model performance after (semi-)global aggregations with non-i.i.d data samples and provides personalized ML models with each user. When this module is added, an aggregated (semi-)global model is adjusted for a specific user based on the inferred data distribution. Thus, it realizes collective intelligence customized for a user-specific environment and task.

The standard federated learning typically assumes that all user's data come from a similar distribution so that every single agent can benefit from other's data by participating in the federated learning process. However, if the distribution of an agent's dataset drifts far away from the average distribution among all the other agents, the global model trained from federated learning might be ineffective to this agent. To resolve this problem, it is necessary to find a way to better utilize the generalization ability of the global model while not compromising the model performance for the local distribution. This motivates an introduction of the personalization module in the system of the present disclosure.

Figure 13:
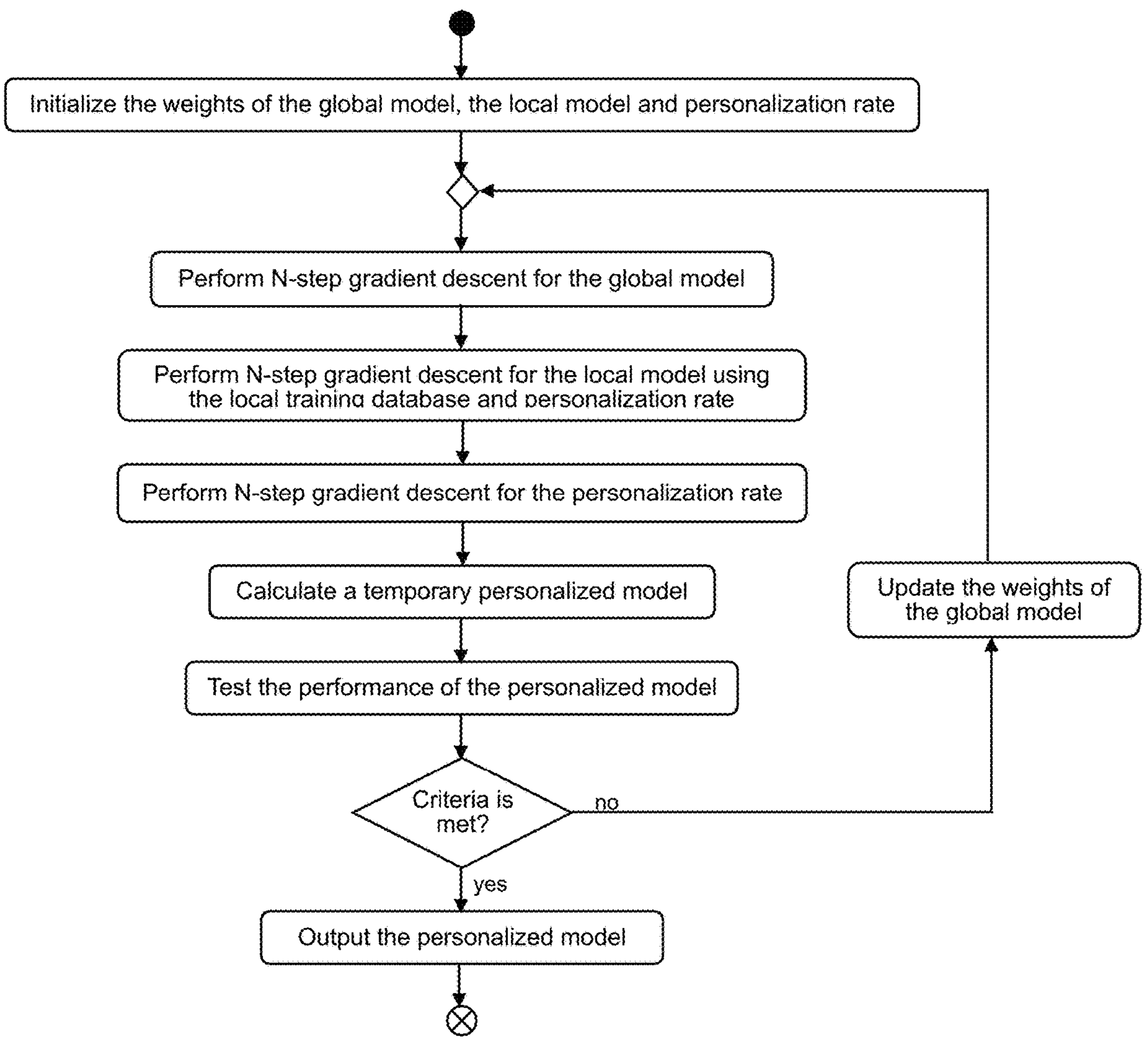
FIG. 13 indicates the algorithm of a personalized FL using two model versions.

This module can be implemented in many different ways. A potential way is to implement the personalization algorithm that slightly overfits a (semi-)global model to the users' data after the user receives the global model from an aggregator. Another approach is to use two model approaches on the user side. Each user maintains two models: one for its use and the other for local training used for the global aggregation. By gradually modifying the first model stored in the user device at each round, the user can use collective intelligence embedded in the global models while it also maintains some personalized model settings. FIG. 13 indicates the algorithm of a personalized FL using two model versions.

More specifically, in this two model approach, for each agent we first randomly initialize the two models, and the personalization rate (which is a number between 0 and 1), where the two models stored at the agent are called local model and global model, respectively. During each round, we perform a certain number of gradient descents for the global models, local models and the personalization rate. Then a personalized model is obtained by combining the local model and the global model using the personalization rate, where the personalization rate measures the extent to which the personalized model mixes the local and the global models. Then the personalized model is tested to check whether a certain performance criteria is met. If the criteria is not met, the global model is updated using and a new round of training is started. This procedure repeats until the performance criterion is satisfied, in other words, the personalized model generalizes sufficiently well for the local dataset distribution. Finally, the personalized model for each agent is output.

The personalization can be extendedly interpreted as a model aggregation for each group ofusers who share a similar behavioral pattern. The group-level model management and preparation virtually cluster all the users into multiple groups by incorporating a feature vector-based clustering method. This enables the customization and advanced control of ML models distributed by aggregators for different types of users.

D. Secure and Privacy-Preserving Distributed Learning

D1. Privacy Preserving with Differential Privacy

Figure 14:
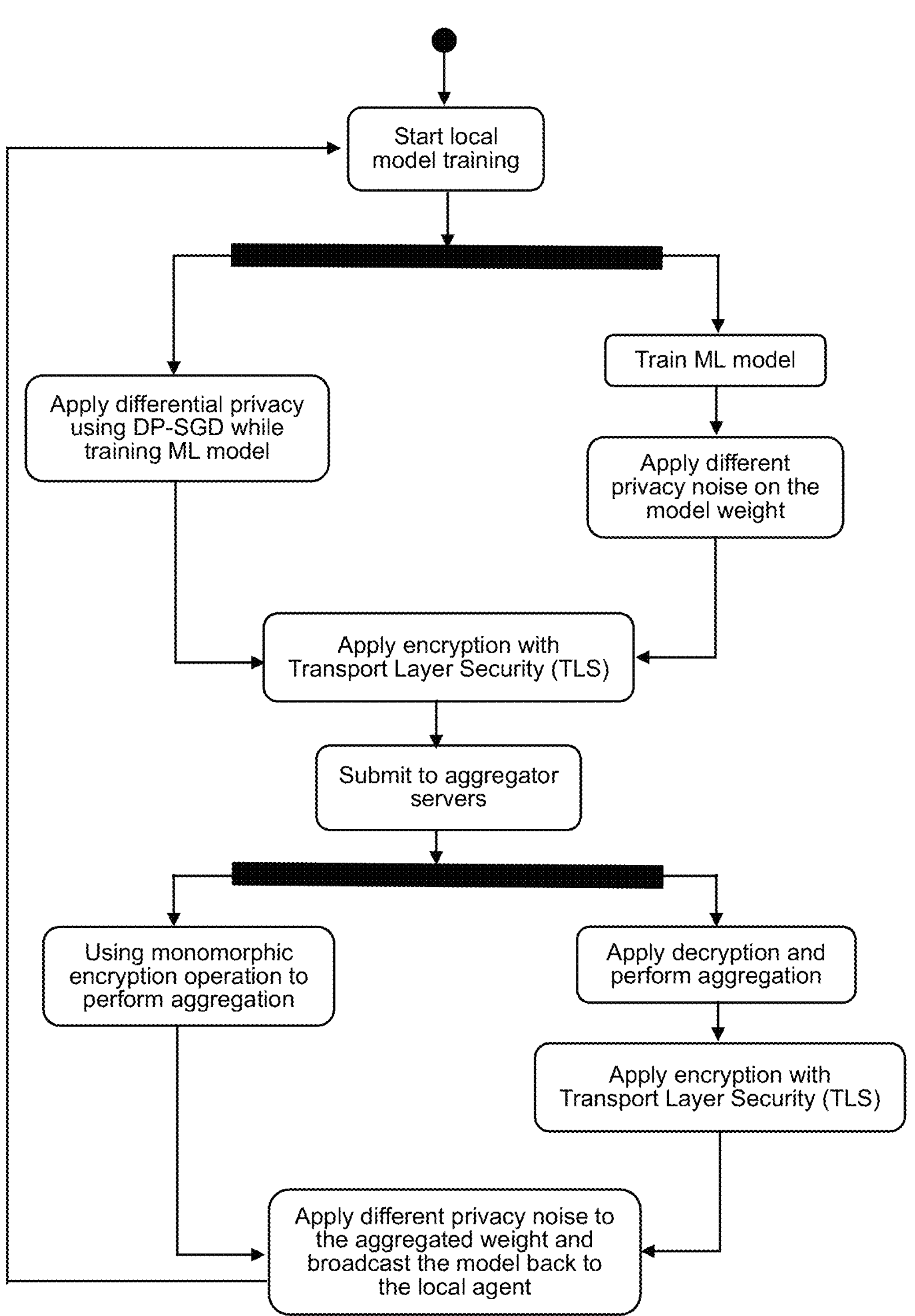
FIG. 14 summarizes the process to anonymize user model weights using a differential privacy technique.

Assuming the cluster aggregators are located at the network edge such as cloudlets, the devices communicate with the aggregator exchanging their locally trained model and the latest model aggregated in the aggregator. Here, the privacy-preserving aspect is realized by keeping raw data in each device. Additionally, the communication between aggregators and users can be anonymized using a differential privacy algorithm, which adds randomized noises to local models before users sending them to aggregators in a way that each aggregator can observe an approximated weight distribution over all the uploaded local models. This enables an aggregator to statistically identify the weights updated by each local training while preventing the aggregator from knowing the mapping between a specific model and a user. FIG. 14 summarizes the process to anonymize user model weights using a differential privacy technique.

D2. Model Filter for Enhanced Security

The encapsulation of local ML training at each user's device makes FL more vulnerable to model poisoning attacks, where an attacker tempers the model weights uploaded to an aggregator. A model poisoning attack is conducted by an attacker joining rounds of FL training and pushing the poisoned model to the aggregation server, which eventually leads to the manipulation of global models. A goal of an attacker is to inject negative influence upon the global model by uploading malicious models to the aggregator.

The model filter module is designed to identify the models that are potentially harmful to the entire aggregation process by inspecting the distribution of weight parameters in the uploaded models. This filter is implemented at each aggregator and used before each aggregation process.

A potential implementation is based on a neural network classifier. By collecting normally-trained models, we can train the classifier so it can detect malicious models with abnormal weight distribution. Another approach is to use unsupervised learning such as clustering techniques to classify all the models uploaded to an aggregator. Based on the clustering, it is possible to identify potentially malicious outlying models and remove them from the aggregation process.

Figure 15:
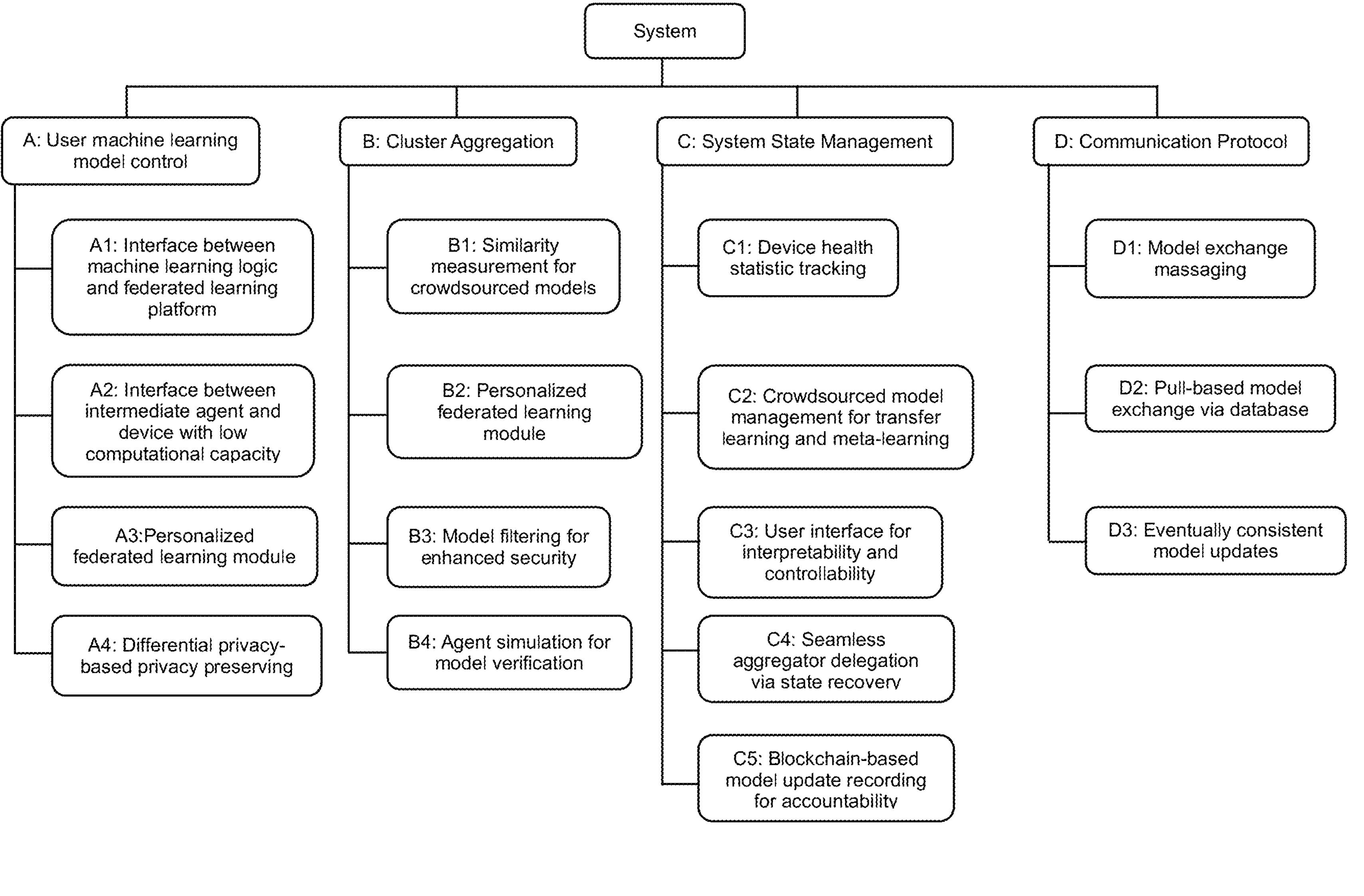
FIG. 15 illustrates all the main functionalities of the system.

FIG. 15 is a component diagram illustrating main functionalities of one embodiment of the system of the present disclosure.

Column A represents the user machine learning model control, which has the following functionalities:

- A1: Interface between Machine Learning Logic and Federated Learning platform: The application-level interface is designed to accommodate diverse machine learning applications to the distributed Artificial Intelligence platform. The interface provides a standardized way to connect a service-specific ML logic to the federated learning platform;

A2: Interface between Intermediate Server and Device with Low Computational Capability: Refer Section III.B.(ii);

A3: Personalized Federated Learning Module: Refer Section III.B.(iii); and

A4: Differential Privacy-based privacy-preserving: The weight values of a local model are anonymized by a differential privacy technique.

Column B represents the cluster aggregation, which has the following functionalities:

B1: Similarity Measurement for Crowdsourced Models: Refer Section III.B.(i);

B2: Personalized Federated Learning Module: Refer Section III.B.(iii);

B3: Model Filtering for Enhanced Security: To select an appropriate subset of the uploaded agent models, each cluster aggregator observes the historical data of the models uploaded by every agent; and B4: Agent Simulation for Model Verification: Refer Section III.B.(v).

Column C represents the system state management, which has the following functionalities:

C1: Device Health Statistics Tracking: The storage saves device health statistics to identify the technical problems in model training;

C2: Crowdsourced Model Management for Transfer Learning and Meta-Learning: Refer Section III.B.(i);

C3: User Interface for Interpretability and Controllability: Refer Section III.B.(vi);

C4: Seamless Aggregator Delegation via State Recovery: After detecting the failures, the neighboring aggregators collaboratively inherit connections with the agents that were hosted by the failed aggregator. The agent does not need to know the change of which aggregator is connected to after such failures; and C5: Blockchain-based Model Update Recording for Accountability: The immutable ledger can keep track of model transitions and the impacts of each agent and CA over the semi-global model.

Column D represents the communication protocol, which has the following functionalities:

D1: Model Exchange Messaging: Every model update message contains meta-model information such as generated time, sample size, aggregation preferences, and entity-identification information along with a set of local models;

D2: Pull-based Model Exchange via Database: Each CA randomly chooses a subset of cluster aggregators to synthesize a semi-global model locally using their cluster models. Since the cluster models are stored in a distributed database system that provides a hashed unique identifier for each model, the CA issues queries to obtain the models using the hash function; and D3: Eventually Consistent Updates: The aggregators do not need to pull all the other models at a time. It can synthesize a subset of cluster models to reduce computational complexity. Incorporating some randomization in selecting the subset, we guarantee the cluster model reaches a global model with a certain probability.

The invention claimed is:

1. A system for decentralized federated learning, comprising:

multiple agents coupled to a communication network, each agent comprising a data collector collecting raw data;

a memory storing the collected raw data and a local machine learning model; and a processor training the local machine learning model by using the collected raw data to update the local machine learning model, multiple cluster aggregators coupled to the communication network, each cluster aggregator being uniquely associated with a respective subset of the agents, each cluster aggregator comprising a model collector collecting the local machine learning models from the associated agents;

a memory storing the collected local machine learning models; and a processor creating a respective cluster machine learning model, which is a first-level aggregated model, from the collected local machine learning models from its associated agents, and a distributed database operatively coupled to the multiple cluster aggregators and configured to store the local machine learning models, the respective cluster machine learning models created by the cluster aggregators, and a semi-global machine learning model synthesized by said cluster aggregators, wherein the distributed database identifies each of the local machine learning models, the respective cluster machine learning models and the semi-global machine learning models by a globally unique hash value to provide accountability and traceability of model provenance across the decentralized federated learning system, each of the multiple cluster aggregators is configured to act as a peer in a distributed network of aggregators and to communicate directly with at least a subset of other cluster aggregators within a group of cluster aggregators to exchange their respective cluster machine learning models therebetween, each said cluster aggregator further configured to synthesize the semi-global machine learning model, which is a second-level aggregated model, from the cluster machine learning models received from said at least subset of other aggregators, each of the cluster aggregators is configured to send its synthesized semi-global machine learning model to its associated agents, each of the agents is configured to update its local machine learning model with the semi-global machine learning model received from the associated cluster aggregator, and detecting a failure of a first cluster aggregator of the multiple cluster aggregators; automatically re-assigning at least one agent that was associated with the first cluster aggregator to a second cluster aggregator of the multiple cluster aggregators; and recovering a state of the first cluster aggregator by the second cluster aggregator using the state stored in the distributed database and the globally unique hash value to seamlessly continue the decentralized federated learning.

2. The system for decentralized federated learning according to claim 1, wherein each of the local machine learning models, the respective cluster machine learning models, and the semi-global machine learning models on the distributed database has meta information, the meta information including at least one of a model generation time, a size of training samples, or a task type, so that the models are searchable by specifying queries based on said meta information.

3. The system for decentralized federated learning according to claim 1, wherein performances of the local machine learning models, the respective cluster machine learning models, and the synthesized semi-global machine learning models, said performances including at least model accuracy and convergence metrics, are constantly evaluated and visualized on a graphical user interface of the agents to allow users to monitor the learning progress and the effectiveness of the received semi-global machine learning models.

4. The system for decentralized federated learning according to claim 1, wherein at least one of the agents utilizes a neural network to train the local machine learning model and the neural network comprising an embedding block configured to receive a state of the local machine learning model as an input and to convert the state into a common representation by applying a learned transformation that maps heterogeneous local model states from different agents into said common representation space, thereby accounting for heterogeneity of the local machine learning models across said agents, an inference block configured to receive the common representation of the input from the embedding block and to produce an output indicative of a task-specific interface, and a transfer block configured to receive the common representation of the output from the inference block and to convert the common representation of the output into an output value compatible with a process model utilized by the agent.

5. The system for decentralized federated learning according to claim 1, wherein at least one of the cluster aggregators comprises an agent simulator configured to emulate an agent's operational environment and test at least one of the local machine learning models received from an associated agent, the respective cluster machine learning models, and the synthesized semi-global machine learning model created by said cluster aggregator, prior to distributing said semi-global machine learning model, to verify a validity of the tested machine learning model against predefined test case and performance thresholds, wherein the validity relates to whether the machine learning model will perform a task on an agent to a required level of performance without causing operational failure.

6. The system for decentralized federated learning according to claim 1, wherein the multiple cluster aggregators form a plurality of distinct groups of cluster aggregators, and wherein cluster aggregators belonging to different said distinct groups communicate with each other periodically to exchange their respective synthesized semi-global machine learning models to create a global machine learning model that aggregates learnings from agents associated with said different distinct groups of cluster aggregators.

7. The system for decentralized federated learning according to claim 6, further comprising a model repository, accessible by the plurality of cluster aggregators, storing a plurality of the global machine learning models previously created by the system as Crowdsourced Global Manipulation Models and meta-data indicating tasks used for training the respective global machine learning models, wherein at least one of the cluster aggregators comprises a Model Selector function configured to, upon receiving a new task from one of the associated agents, as a preliminary step before training for the new task, compute similarity distances between the new task and the tasks described in the meta-data of the global machine learning models stored in the model repository and the received new task, and to select and retrieve from the model repository a global machine learning model having a smallest similarity distance to the new task, and updates its semi-global machine learning model with the retrieved global machine learning model having the smallest similarity distance as a pre-trained starting point to initialize or enhance learning for the new task.

8. The system for decentralized federated learning according to claim 1, wherein at least one of the agents is further configured to generate a learnable personalization rate as a parameter to be optimized, said personalization rate initialized within a range from more than 0 to less than 1; performs a given number of gradient descents for parameters of the global machine learning model received from its associated cluster aggregator, parameters of its updated local machine learning models and for the learnable personalization rate itself to iteratively update the parameter and the personalization rate; obtains a personalized machine learning model by combining its updated local machine learning model and the semi-global machine learning model using the iteratively updated learnable personalization rate, where the updated learnable personalization rate measures an extent to which the personalized machine learning model mixes the updated local and the semi-global machine learning models; tests the personalized model to check whether a certain performance criteria is met; and, when the performance criteria is met, outputs the personalized machine learning model.

9. The system for decentralized federated learning according to claim 1, wherein the agents retain the raw data and send only the trained local machine learning model, which comprises model parameters or model parameter updates but not the collected raw data itself, to the cluster aggregators.

10. A computer-implemented method for decentralized federated learning, comprising:

collecting, by multiple agents, raw data;

training, by the agents, local machine learning models by using the collected raw data to update the local machine learning models;

collecting, by multiple cluster aggregators each uniquely associated with a respective subset of the agents, the local machine learning models from their associated agents;

creating, by each of the cluster aggregators, a respective cluster machine learning model, which is a first-level aggregated model, from the local machine learning models from its associated agents;

storing, in a distributed database operatively coupled to the multiple cluster aggregators, the local machine learning models, the respective cluster machine learning models created by the cluster aggregators, and a semi-global machine learning model synthesized by the cluster aggregators;

identifying each of the local machine learning models, the respective cluster machine learning models and the semi-global machine learning models in the distributed database by a globally unique hash value to provide accountability and traceability of model provenance across the decentralized federated learning system;

exchanging, directly between at least a subset of said multiple cluster aggregators within a group of cluster aggregators, their respective cluster machine learning models therebetween;

synthesizing, by each said cluster aggregator, the semi-global machine learning model, which is a second-level aggregated model, from the cluster machine learning models received from said at least subset of other cluster aggregators;

sending, by each of the cluster aggregators, its synthesized semi-global machine learning model to its associated agents;

updating, by the agents, the local machine learning models with the semi-global machine learning models received from their associated cluster aggregators, detecting a failure of a first cluster aggregator of the multiple cluster aggregators; automatically re-assigning at least one agent that was associated with the first cluster aggregator to a second cluster aggregator of the multiple cluster aggregators; and recovering a state of the first cluster aggregator by the second cluster aggregator using the state stored in the distributed database and the globally unique hash value to seamlessly continue the decentralized federated learning.

11. The computer-implemented method for decentralized federated learning according to claim 10, wherein each of the local machine learning models, the respective cluster machine learning models, and the semi-global machine learning models on the distributed database has meta information, the meta information including at least one of model generation time, a size of training samples, or a task type, so that the models are searchable by specifying queries based on said meta information.

12. The computer-implemented method for decentralized federated learning according to claim 10, further comprising:

constantly evaluating performances of the local machine learning models, the respective cluster machine learning models, and the synthesized semi-global machine learning models, said performances including at least model accuracy and convergence metrics; and visualizing the evaluated performances on a graphical user interface of the agents to allow users to monitor the learning progress and the effectiveness of the received semi-global machine learning models.

13. The computer-implemented method for decentralized federated learning according to claim 10, wherein at least one of the local machine learning models is trained by using a neural network comprising an embedding block configured to receive a state of the local machine learning model as an input and to convert said state into a common representation by applying a learned transformation that maps heterogeneous local model states from different agents into said common representation space, thereby accounting for heterogeneity of the local machine learning models across the agents, an inference block configured to receive the common representation of the input from the embedding block and to produce an output indicative of a task-specific inference, and a transfer block configured to receive the common representation of the output from the inference block and to convert said common representation of the output into an output value compatible with a process model utilized by the agent performing said training.

14. The computer-implemented method for decentralized federated learning according to claim 10, further comprising testing, by at least one of the cluster aggregators using an agent simulator configured to emulate an agent's operational environment, at least one of the collected local machine learning models received by said cluster aggregator, the respective cluster machine learning model created by said cluster aggregator, and the synthesized semi-global machine learning model created by said cluster aggregator, prior to said sending the semi-global machine learning model, to verify validities of the collected local machine learning models against predefined test cases and performance thresholds, wherein the validity relates to whether the machine learning model will perform a task on an agent to a required level of performance without causing operational failure.

15. The computer-implemented method for decentralized federated learning according to claim 10, wherein the multiple cluster aggregators form a plurality of distinct groups of cluster aggregators, and further comprising the cluster aggregators belonging to different said distinct groups communicate with each other periodically to exchange their respective synthesized semi-global machine learning models to create a global machine learning model that aggregates learnings from agents associated with said different distinct groups of cluster aggregators.

16. The computer-implemented method for decentralized federated learning according to claim 15, further comprising:

Storing, in a model repository accessible by the plurality of cluster aggregators, a plurality of the global machine learning models previously created by the system as Crowdsourced Global Manipulation Models and meta-data indicating tasks used for training the respective global machine learning models;

inputting a new task by a user to one of the associated agents, wherein said agent communicates the new task to its associated cluster aggregator;

computing, by said associated cluster aggregator utilizing a Model Selector function the aggregators, as a preliminary step before training for the new task, similarity distances between the new task and the tasks described in the meta-data of the global machine learning models stored in the model repository and the new task;

selecting and retrieving from the model repository a global machine learning model having a smallest similarity distance to the new task; and updating, by the associated cluster aggregators, the semi-global machine learning model of the associated cluster aggregator with the retrieved global machine learning model having the smallest similarity distance as a pre-trained starting point to initialize or enhance learning for the new task.

17. The computer-implemented method for decentralized federated learning according to claim 10, further comprising, by at least one of the agents:

generating a learnable personalization rate as a parameter to be optimized, said personalization rate initialized within a range from more than 0 to less than 1;

performing a given number of gradient descents for parameters of the semi-global machine learning model received from its associated cluster aggregator, parameters of its updated local machine learning model, and for the learnable personalization rate itself to iteratively update said parameters and the personalization rate;

obtaining a personalized machine learning model by combining its updated local machine learning model and the global machine learning model using the iteratively updated learnable personalization rate, where the updated learnable personalization rate measures an extent to which the personalized machine learning model mixes the updated local and the semi-global machine learning models;

testing the personalized model to check whether a certain performance criteria is met; and outputting, when the performance criteria is met, the personalized machine learning model.

18. The computer-implemented method for decentralized federated learning according to claim 10, wherein the agents retain the raw data and send only the trained local machine learning model, which comprises model parameters or model parameter updates but not the collected raw data itself, to the cluster aggregators.

* * * * *